United States Patent [19]

Check et al.

[11] 4,191,007

[45] Mar. 4, 1980

[54] REEL MOWER SHIELD ASSEMBLY

[75] Inventors: Joseph M. Check, Minneapolis; E. Smith Reed, Jr., Deephaven, both of Minn.

[73] Assignee: The Toro Company, Minneapolis, Minn.

[21] Appl. No.: 918,588

[22] Filed: Jun. 23, 1978

[51] Int. Cl.² .................. A01D 35/22; A01D 53/06
[52] U.S. Cl. ............................ 56/199; 56/14.7
[58] Field of Search ............... 56/194–200, 56/202, 201, 7, 13.4, 14.7

[56] References Cited

U.S. PATENT DOCUMENTS

| 934,361 | 9/1909 | Roush | 56/199 |
|---|---|---|---|
| 2,162,783 | 6/1939 | Moyer | 56/14.7 |
| 3,753,340 | 8/1973 | Mathews | 56/200 |

Primary Examiner—Russell R. Kinsey

Attorney, Agent, or Firm—Merchant, Gould Smith, Edell, Welter & Schmidt

[57] ABSTRACT

An improved shield member for directing the grass clippings cut by a reel-type mower into a grass catcher. The shield member encompasses a portion of the circumference of the reel from the side of the reel opposite the grass catcher and has an inner surface spaced apart from the reel to define a cut clipping discharge passageway. A cut-off bar is mounted to the shield member and extends inwardly from its inner surface toward the reel and functions to direct grass clippings or mats of grass that tend to adhere to the inner surface of the shield member into the path of the cutting reel blades whereby the grass clippings or grass clumps are struck by the cutting blades and sufficient velocity is imparted to the grass to project the grass in a desired trajectory into the grass catcher position forwardly of the cutting reel.

9 Claims, 6 Drawing Figures

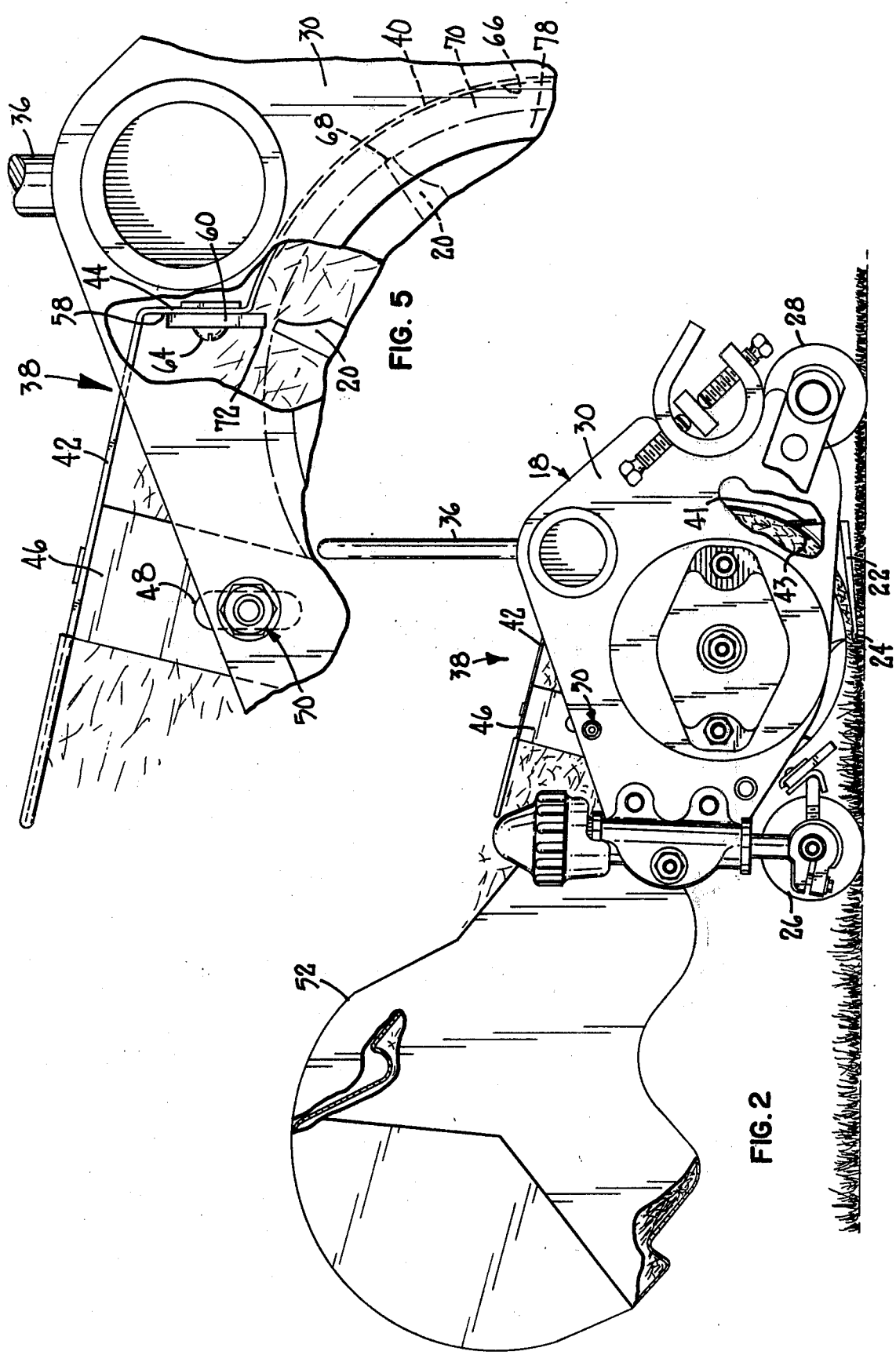

REEL MOWER SHIELD ASSEMBLY

BACKGROUND OF THE INVENTION

The present invention relates broadly to reel-type mowing apparatus and, in particular, to an improved shield member for the cutting reel of a reel-type mower.

Reel-type mowers are well-known in the prior art. In such apparatus the cutting reel is typically mounted for rotation about a horizontal axis that is transverse to the direction of travel of the mower. The cutting reel has a plurality of blades which cooperate with a bed knife to cut grass with a scissor-like action. Prior art reel mowers include those wherein the cutting reel is mechanically driven through a linkage with ground engaging wheels. In some prior art apparatus the reel is driven by a suitable motor means. In such prior art devices it is often desirable to collect the cut grass clippings in a grass basket or other container. Typically, the grass basket or catcher is placed either directly in front of or in back of the reel. The location of the grass basket generally will depend upon the configuration of the mower.

In many applications it is more convenient to collect the clippings in a catcher disposed generally forward of the cutting reel. This configuration has specific application in greenskeeping equipment. In a particular prior art mower manufactured and sold by the assignee of the present invention, a plurality, typically three, of cutting reels are mounted for overlapping areas of cut. The mower is self-propelled and is designed for the operator to ride thereon. In order to collect the grass clippings forwardly of the reel, the clippings must be redirected after they are cut. The typical prior art solution is to place a shield that encompasses the reel on the side of the reel opposite the grass basket. The cut clippings are thereby trapped between the reel and the shield and are discharged forwardly by the cutting blades impelling the grass clippings in the desired forward trajectory.

This prior art shield configuration has been found to experience problems specifically when the grass being cut is relatively lush and sticky or wet. The grass clippings tend to stick to the grass shield rather than simply flying into the grass basket. Clippings that are stuck to the inside surface of the grass shield generate a thick buildup until the mat formed thereby either falls off, gets knocked off by other grass clippings or as is most common, forms a small mat of grass. The leading edge of the mat of grass formed is lifted off the surface of the shield and rolled up along the shield into a small roll that then dribbles out from the reel at a slow velocity. This grass is thus not propelled in the intended trajectory into the grass basket. This small roll of grass or the grass clumps falling short of the basket onto the ground produce an undesirable appearing mowed area. In greenskeeping applications such a situation is a significant problem area leading to additional work in cleaning the cut area after it has been cut and/or in complaints from golfers about the condition of the greens.

The present invention substantially eliminates this problem associated with the prior art in that it is a shield means which is designed to ensure that all the grass clippings or matted grass buildup are directed into the path of the cutting reel blades. The cutting reel blades rotating at a relatively high velocity strike and impel the grass clippings forwardly in the desired trajectory toward the grass basket or catcher. The present invention thereby provides more effective collection of the cut clippings resulting in improved appearance of the mowed area.

SUMMARY OF THE INVENTION

The present invention is, therefore, an improved shield means for directing clippings into a grass clipping catcher spaced apart from the cutting reel of a reel-type mower. The improved shield means includes a shield member that encompasses a portion of the circumference of the cutting reel on the opposite side of the reel from the grass catcher. The shield member extends from a bottom end proximate a bed knife associated with the cutting reel to a top end extending generally toward the grass catcher. The shield member has an inner surface with a radius of curvature greater than the radial dimension between the cutting blades and the horizontal rotational axis of the reel, and the inner surface in conjunction with the reel define the cut clipping discharge passageway. A cut-off bar is mounted proximate the top end of the shield member and extends inward from the inner surface of the shield member toward the reel. The bar is disposed in a plane generally normal to the direction of the cut clippings and directs the cut clippings into the path of the blades of the cutting reel whereby the blades impart sufficient velocity to the grass clippings to propel them in the desired trajectory toward and into the grass catcher.

In the preferred embodiment, the shield member has a curved first portion extending from the bottom end, a planar second portion extending generally toward the grass catcher, and an offset portion connecting the curved first portion with the planar second portion. The cut-off bar is typically mounted to the offset portion and is adjustable inward and outward with respect to the inner surface of the curved portion so that as the outer tip of the cutting blades wear down under continued use the cut-off bar can be lowered to maintain optimum spacing between the lower edge of the cut-off bar and the outer tip of the cutting blades. The offset portion functions to raise the planar second portion substantially out of the path of the clippings as they are thrown toward the grass catcher. Thus, the tendency of the grass clippings to stick or adhere to the planar member is minimized. The planar member itself acts to shield the cut clippings from ambient wind conditions such that the cut clippings will not be blown from their desired trajectory toward the grass catcher.

Utilizing the improved shield means of the present invention, the effectiveness of grass clipping collection is significantly improved along with the improved appearance of the mowed area. These and other advantages of the present invention will become apparent with reference to the accompanying drawings, detailed description of the preferred embodiment, and claims.

BRIEF DESCRIPTION OF THE DRAWINGS

FIG. 2 is a view in side elevation of one cutting reel apparatus shown removed from the mower of FIG. 1 and with portions thereof broken away;

FIG. 5 is an enlarged fragmentary view in elevation of a portion of FIG. 2 with additional portions thereof broken away;

DETAILED DESCRIPTION OF THE PREFERRED EMBODIMENT

Figure 1:
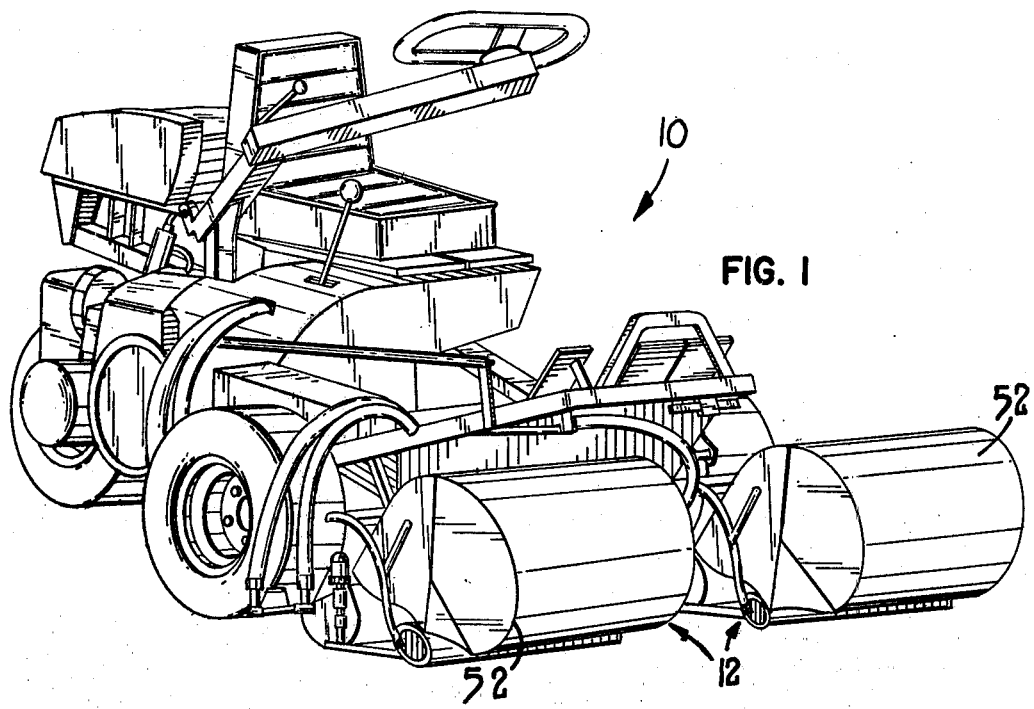
FIG. 1 is a view in perspective illustrating a riding mower having reel-type cutting apparatus incorporating the present invention.

Referring to the drawings, wherein like numerals represent like parts throughout the several views, a riding mower 10 that includes a plurality of reel-type cutting heads that utilize the present invention is shown in FIG. 1. It will be understood that the present invention is not limited in application to the mower disclosed in FIG. 1 and in fact has equal applicability in any reel-type grass cutting apparatus. In the embodiment disclosed herein, riding mower 10 is of the type typically used in the maintenance of golf greens where the grass must be evenly cut and the height thereof accurately monitored and controlled. Additionally, it is desirable to remove as much of the grass clippings from the putting green as possible. Riding mower 10 includes three reel-type cutting heads 12, one of which is not shown but is mounted generally to the rear of the forward cutting heads. Cutting heads 12 are mounted about parallel horizontal axes and ganged such that the cutting paths overlap. Cutting heads 12 have cutting reels driven by hydraulic motors as will be described in more detail hereafter, however the present invention is equally applicable to other apparatus having alternative cutting reel drives.

Figure 3:
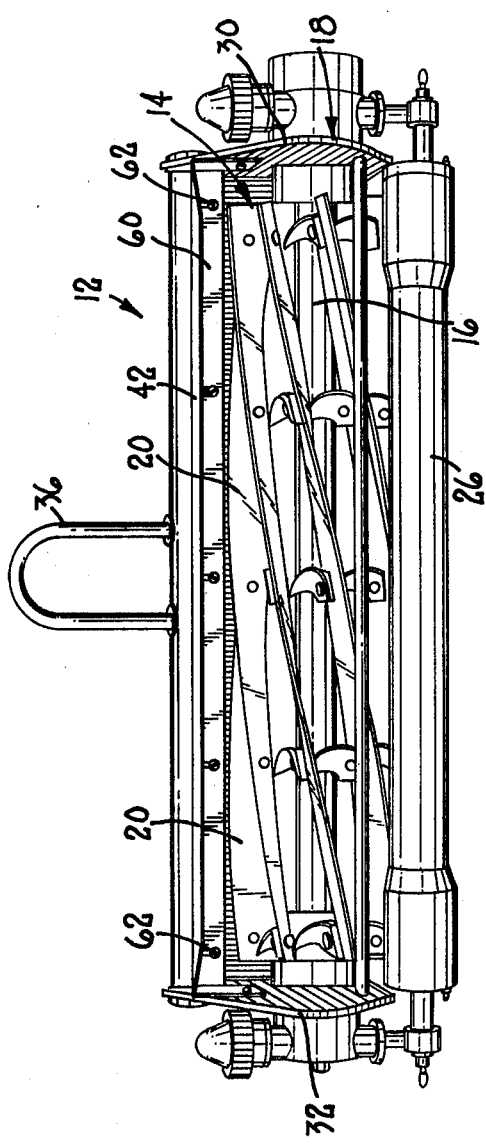
FIG. 3 is a front elevational view of the cutting reel apparatus shown in FIG. 2 with the grass catcher removed.
Figure 4:
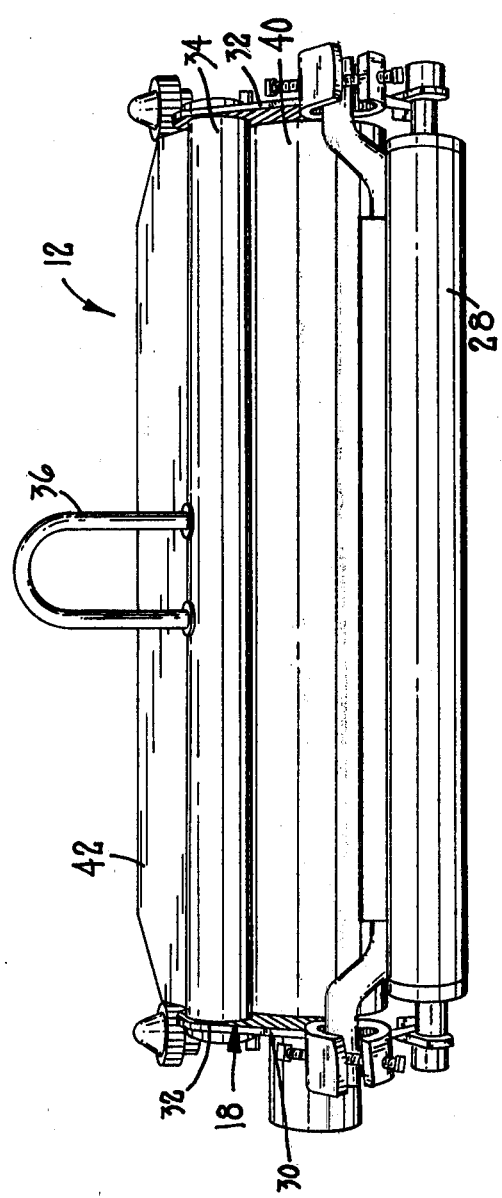
FIG. 4 is a rear elevational view of the cutting reel apparatus of FIG. 2.

One of cutting heads 12 is illustrated in more detail in FIGS. 2–4. Cutting heads 12 are mounted on riding mower 10 by conventional means, such conventional means not shown in great detail since the mounting means does not form a part of the present invention. Referring specifically to FIGS. 3 and 4, a cutting head 12 includes a cutting reel designated generally as 14 having a shaft 16 rotatably mounted to a housing 18 for rotation about a generally horizontally disposed axis. Affixed to shaft 18 by conventional means is a plurality of cutting blades 20 of conventional prior art configuration. Suitable bearing means known to one skilled in the art may be provided to journal shaft 16 to housing 18. Additionally, a hydraulic drive motor or other drive means may be mounted and connected at one end of shaft 16. A bed knife 22 is also mounted to housing 18 and has a cutting edge 24 and extends substantially across the width of cutting reel 14 to cooperate with cutting blades 20 in severing the grass. As previously mentioned, this type of reel cutting is well-known in the prior art. Front and rear rollers 26 and 28 respectively, are also provided and connected to housing 18. Rollers 26 and 28 are mounted for rotation about horizontal axes and may be adjusted vertically to control the height of the cut grass. Housing 18 has a pair of side members 30 and 32 in which shaft 16 is rotatably mounted by suitable bearing means as described above. Housing 18 also includes a rear end member 34 to which a loop member 36 is affixed to facilitate raising and lowering of cutting heads 12 when connected to mower 10.

A shield member 38 is mounted to housing 18 and includes a curved member 40 which encompasses substantially a rearwardly facing circumferential portion 76 of reel 14. Curved member 40 has a bifurcated lower end portion 41 that mounts and rests on an apex end portion 43 of bed knife 22. Shield member 38 is shown in more detail in the general diagrammatic representation of FIG. 6. Shield member 38 also includes a substantially planar member 42 which in the preferred embodiment is joined to curved member 40 by an offset portion 44. Curved member 40 has a radius of curvature slightly greater than the radius of cutting reel 14 to provide clearance between cutting blades 20 and curved member 40. Shield member 38 extends substantially across the entire width of cutting reel 14. As shown specifically in FIG. 6, curved member 40 extends substantially from a position proximate bed knife 22 to the point angularly offset with respect to the vertical as shown by angle "$a$". Planar member 42 extends from offset portion 44 generally beyond cutting reel 14 and at an angle "$b$" with respect to the horizontal. Planar member 42 has a pair of bracket members 46 at the lateral extremities thereof for securing shield member 38 to side members 30,32. Elongated slots 48 are provided in bracket members 46 and conventional threaded bolt and nut means 50 are provided to be received within slot 48 for securing bracket members 46 to side members 30.

Positioned forwardly of cutting reel 14 are grass catchers 52 into which cut grass clippings are deposited. Grass catchers 52 may be mounted by any convenient means on the frame of riding mower 10 or to the cutting head 12. Grass catchers 52 will be removably attached such that when they become filled with clippings, they can be removed and clippings dumped therefrom. Preferably, grass catchers 52 are molded of suitable plastic material and are relatively lightweight members. As shown particularly in the diagrammatic representation of FIG. 6, each grass catcher 52 defines an enclosed receiving chamber 54 with an opening at 56 directed generally toward cutting reel 14.

Referring in particular to FIG. 5, offset portion 44 has an inner surface 58 on which is mounted a cut-off or deflected bar 60. As shown in FIG. 3, cut-off bar 60 is provided with a plurality of spaced elongated slots 62 by which bar 60 is adjustably secured to offset portion 44 by conventional fastening means 64. Cut-off bar 60 extends substantially across the entire width of cutting reel 14 and is mounted for vertical adjustment. Specifically, cut-off bar 60 can be adjusted to control the clearance between cut-off bar 60 and cutting blades 20.

Figure 6:
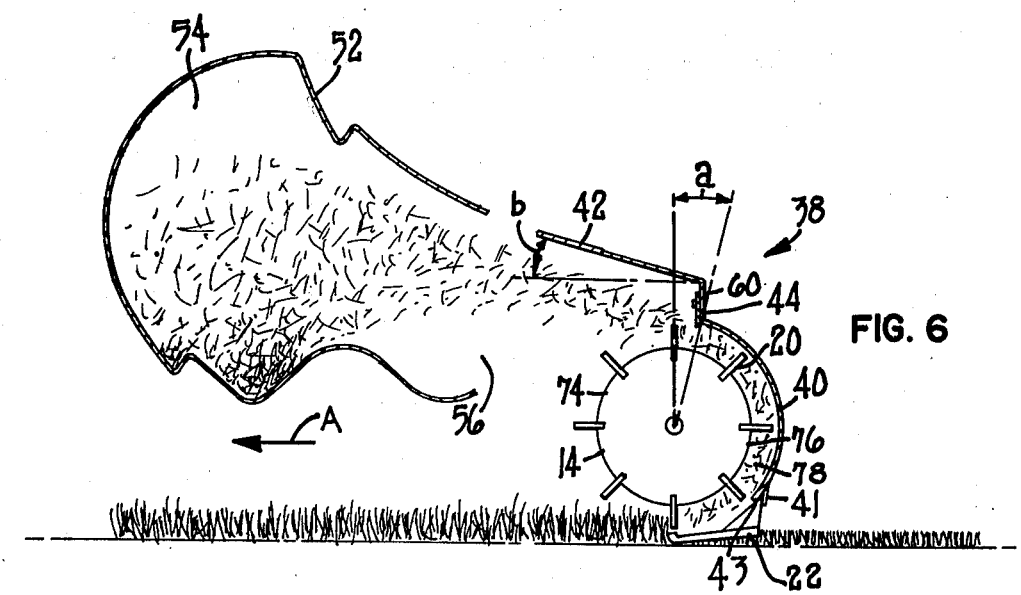
FIG. 6 is a diagrammatic representation illustrating generally the configuration and operation of the present invention.

As shown in particular in FIGS. 5 and 6, curved member 40 has an inner surface 66 with a radius of curvature greater than the maximum radial distance from the rotational center of cutting reel 14 to an outer tip 68 of each cutting blade 20. Space 70 which can be generally defined as space between inner surface 66 and a plane defined by outer tips 68 as they rotate, provides an area wherein typically cut grass clippings travel at a slower rate than cut grass clippings which are struck and impelled by cutting blades 20. Space 70 may also have a relatively turbulent air flow pattern. Thus, particularly in lush or wet grass the clippings tend to adhere to surface 66 creating a buildup on curved member 40. In the prior art shields the grass clipping buildup would commonly form a mat of grass which would tend to dribble out the side of the reel at slow velocity and would not be propelled into grass catcher 52. Grass clumps would be deposited on the cut grass leaving an undesirable dirty appearance of the mowed area.

To solve this problem associated with the prior art, the shield member 38 of the present invention includes cut-off bar 60 as previously mentioned mounted for vertical reciprocation to offset portion 44. Cut-off bar 60 is adjusted such that a lower edge 72 thereof is in close proximity to the outer tip 68 of rotating cutting blades 20. As cutting blades 20 wear down under continued use, cut-off bar 60 can be lowered accordingly. In the preferred embodiment, the gap or clearance between lower edge 72 and outer tip 68 should be between 0.001 and 0.250 inches. A typical optimum setting for the gap or spacing is 0.0625 inches. Cut-off bar 60 therefore extends substantially to close space 70 at the upper end thereof. Grass clippings and clumps which form on inner surface 66 will therefore tend to be driven against cut-off bar 60 which will direct or deflect the grass downward into the path of rotating blades 20. It should be understood that cut-off bar 60 does not function to cut or sever any grass. Rotating blades 20 will strike the grass clippings and accumulated grass clumps imparting sufficient velocity thereto to impel the grass into chamber 54. Vertically oriented offset portion 44 raises planar member 42 substantially out of the path of the grass clippings impelled toward grass catcher 52. Planar member 42 lies in a plane that may be characterized as parallel to a plane tangential to cutting reel 14 and planar member 42 extends toward catcher 52 to shield the discharged grass clippings from ambient wind conditions that may tend to blow the clippings from their intended trajectory into chamber 54. As previously mentioned, offset portion 44 is disposed circumferentially about reel 14 with respect to a line drawn vertically to the rotational center of reel 14 at an angle "a." In one embodiment of the invention the angle a is approximately 15½ degrees. The position of offset portion 44 is essentially selected to provide the proper trajectory for grass clippings to be thrown into grass catcher 55. At the same time, planar member 42 is disposed sufficiently out of the trajectory of the grass clippings to substantially eliminate the accumulation of grass on planar member 42.

The operation of the present invention will now be described with particular reference to FIGS. 5 and 6. Mower 10 is driven in the direction indicated by the arrow A in FIG. 6. Cutting reel 14 as shown in FIG. 6 is driven in a counterclockwise direction and with respect to the direction of travel A can be generally defined as having a frontwardly facing circumferential portion 74 and rearwardly facing circumferential portion 76. Blades 20 and bed knife 22 cooperate to cut the grass. The cut clippings are impelled by the cutting blades and captured in a space 70 defined by inner surface 66 of curved member 40 and the rearwardly facing circumferential portion 76 of reel 14. The clippings in space 70 tend to travel at a lower velocity than the clippings that are repeatedly struck and impelled by blades 20. Any grass that sticks to surface 66 and tends to form clumps thereon will be slowly driven upward about curved member 40. The lower velocity grass and grass clumps will be directed by cut-off bar 60 back downward into the path of blades 20. These clumps of grass and the previously slower moving clippings are thereby struck by blades 20 and sufficient velocity is imparted thereto to propel the clippings along the desired trajectory into receiving chamber 54. Planar member 42 is sufficiently raised above the desired trajectory of the grass clippings that there will be little tendency for the clippings to stick to planar member 42 and subsequently drop onto the cut grass leaving the undesirable and unsightly appearance. Shield member 38 of the present invention substantially eliminates the problems associated with the prior art by improving the efficiency of collection of the cut grass clippings in grass catcher 52. In the present invention the accumulated buildup of grass on the shield member is removed and directed into the grass catcher as opposed to falling onto the mowed area leaving an unsightly accumulation of clippings. In the field of greenskeeping wherein the present invention has primary application, it can be appreciated that the advantages of the shield member of the present invention over the prior art are significant. As outer tip 68 of cutting blades 20 wear down under continued use, cut-off bar 60 is simply lowered by loosening fastening means 64 and dropping cut-off bar 60 to the new desired location to maintain the clearance between cut-off bar 60 and blades 20 at the optimum values. The adjustment can be made, for example, by placing the blade of a screw driver between lower edge 72 of cut-off bar 60 and outer tip 68 of blades 20 at each lateral end of bar 60 to ensure that cut-off bar 60 is lowered an equivalent amount across the width of cutting reel 14. Although the present invention has been disclosed in the context of power driven reel mowers, and, in particular, with respect to greenskeeping equipment, it will be understood that the present invention has equal applicability with respect to other reel-type mowing apparatus and to include those which include reels that are mechanically driven by the rotation of ground engaging wheels.

What is claimed is:

1. In a reel-type mower having an elongated cutting reel with a plurality of cutting blades, said reel mounted to a housing for rotation about a substantially horizontal axis, a bed knife disposed proximate the ground and cooperating with the cutting blades for scissor-like cutting, and a grass clipping catcher spaced apart from the reel and positioned to receive the cut clippings, an improved shield means for directing cut clippings into the catcher, comprising:

(a) a shield member mounted to the housing and encompassing a portion of the circumference of the reel on the opposite side of the reel from the grass catcher, said shield member having a bottom end proximate the bed knife and a top end disposed generally above the reel, said shield member between said bottom and top ends also having an inner surface with a radius of curvature measured from the horizontal rotational axis of the cutting reel greater than the radial distance between the reel rotational axis and the outer edge of the cutting blades;

(b) a cut-off bar mounted to said shield member at said top end thereof and extending inwardly from said inner surface toward the reel and along substantially tne entire width of the reel, said bar disposed in a plane generally normal to the direction of discharge of the cut clippings by the reel, said shield member, said cut-off bar, and said reel cooperating to define a substantially closed cut-clipping discharge passageway with an opening at said top end, whereby the cut clippings are contained within said discharge passageway in the rotational path of the cutting blade to impel the clippings through said opening into the catcher.

2. An improved shield means in accordance with claim 1 wherein said shield member comprises:

(a) a curved first portion extending from said bottom end of said shield member and substantially encompassing the reel on the side of the reel opposite the catcher; and (b) a second planar portion which is disposed in a plane substantially tangentially oriented with respect to the reel, said second portion extending from said first portion in a direction generally toward the grass catcher.

3. An improved shield means in accordance with claim 2 further comprising an off-set portion connecting said curved first portion to said planar second portion, said off-set portion disposed in a generally vertical plane and having a bottom end thereof connected to said curved first portion at the top end of said curved first portion and a top end connected to said planar second portion.

4. An improved shield means in accordance with claim 1 wherein said cut-off bar is adjustably mounted to said shield member so that said cut-off bar can be raised or lowered with respect to said inner surface.

5. In a reel-type mower having an elongated cutting reel with a plurality of cutting blades, the cutting reel mounted to a housing for rotation about a substantially horizontal axis, a bed knife disposed proximate the ground and cooperating with the cutting blades for scissor-like cutting, and a grass clipping catcher spaced apart from the reel and positioned to receive the cut clippings, an improved shield means for directing cut clippings into the catcher, comprising:

(a) a shield member mounted to the housing, said shield member having a curved first portion extending from a bottom end proximate the bed knife to a top end disposed generally above the cutting reel, said shield member substantially encompassing the reel on the side of the reel opposite the catcher, said first portion having an inner surface with a radius of curvature slightly greater than the maximum radial dimension of the cutting reel, said first portion and the reel defining a cut-clipping discharge passageway;

(b) a second substantially planar portion extending generally toward the catcher, said planar portion second portion lying in a plane oriented generally tangentially with respect to the cutting reel;

(c) an offset portion connecting said top end of said first portion to said second portion, said offset portion lying substantially in a vertical plane and having a bottom end connected to said top end of said first portion and top end connected to said second portion; and (d) a cut-off bar mounted at said top end of said first portion and extending inwardly from said inner surface toward the reel and transversely across the width of the reel, said bar disposed to direct cut clippings in said discharge passageway into the path of the cutting blade whereby the clippings are propelled with adequate velocity into the catcher.

6. A shield member in accordance with claim 5 wherein said cut-off bar is adjustably mounted for reciprocation to and away from said inner surface.

7. A shield member in accordance with claim 5 wherein the clearance between said cut-off bar and the cutting blades of the reel lies in the range between 0.001 inches 0.250 inches.

8. A shield member in accordance with claim 5 wherein said cut-off bar is adjustably mounted to said off-set portion whereby the gap between said cut-off bar and the cutting blades may be adjusted.

9. A shield member in accordance with claim 8 wherein the gap between the bottom edge of said cut-off bar and the outer tip of the cutting blades is selected to be between 0.001–0.250 inches.

* * * * *